United States Patent [19]
Scott et al.

[11] Patent Number: 5,906,666
[45] Date of Patent: May 25, 1999

[54] METHOD AND APPARATUS FOR DELIVERING A CASED GLASS STREAM HAVING IMPROVED RESISTANCE TO HIGH-TEMPERATURE EROSION

[75] Inventors: Garrett L. Scott, Toledo; Philip D. Perry, Perrysburg, both of Ohio

[73] Assignee: Owens-Brockway Glass Container Inc., Toledo, Ohio

[21] Appl. No.: 08/991,764

[22] Filed: Dec. 16, 1997

[51] Int. Cl.[6] .............................. C03B 17/00; C03B 17/02
[52] U.S. Cl. .......................... 65/145; 65/121; 65/374.11; 65/374.12
[58] Field of Search ........................ 65/121, 145, 374.11, 65/374.12

[56] References Cited

U.S. PATENT DOCUMENTS 4,740,401   4/1988   Barkhau et al. ......................... 428/34.6

FOREIGN PATENT DOCUMENTS 0722907   7/1996   European Pat. Off. .
0722908   7/1996   European Pat. Off. .

Primary Examiner—Stanley S. Silverman
Assistant Examiner—Sean Vincent

[57] ABSTRACT

Apparatus for forming a cased glass stream having an inner core glass surrounded by an outer casing glass includes a first orifice for receiving core glass from a first source, and a second orifice vertically spaced beneath and aligned with the first orifice. A chamber surrounds the second orifice and communicates with the second orifice through a metering gap between the first and second orifices. Casing glass is delivered from a second source to the chamber such that glass flows by gravity through the orifices from the first and second sources to form the cased glass stream. The first and second orifices are disposed in respective first and second orifice rings of refractory composition. The first orifice ring has a peripheral flange and an interior passage for glass flow from the first source to the first orifice. The second orifice ring has a peripheral ledge on which the flange rests, and a pocket for cooperating with the underside of the first orifice ring to form the chamber that surrounds the metering gap. At least the underside of the first orifice ring, and preferably the underside of the first orifice ring, the first orifice and the glass flow passage through the first orifice ring, includes a continuous layer of high-temperature erosion-resistant metallic composition such as platinum.

6 Claims, 3 Drawing Sheets

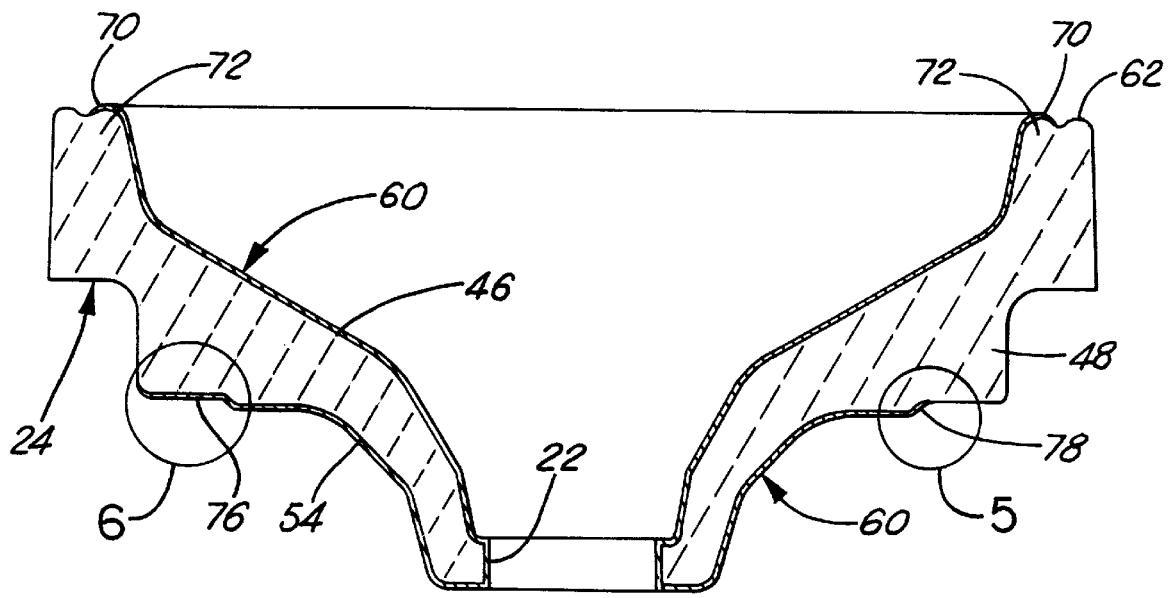
FIG. 4
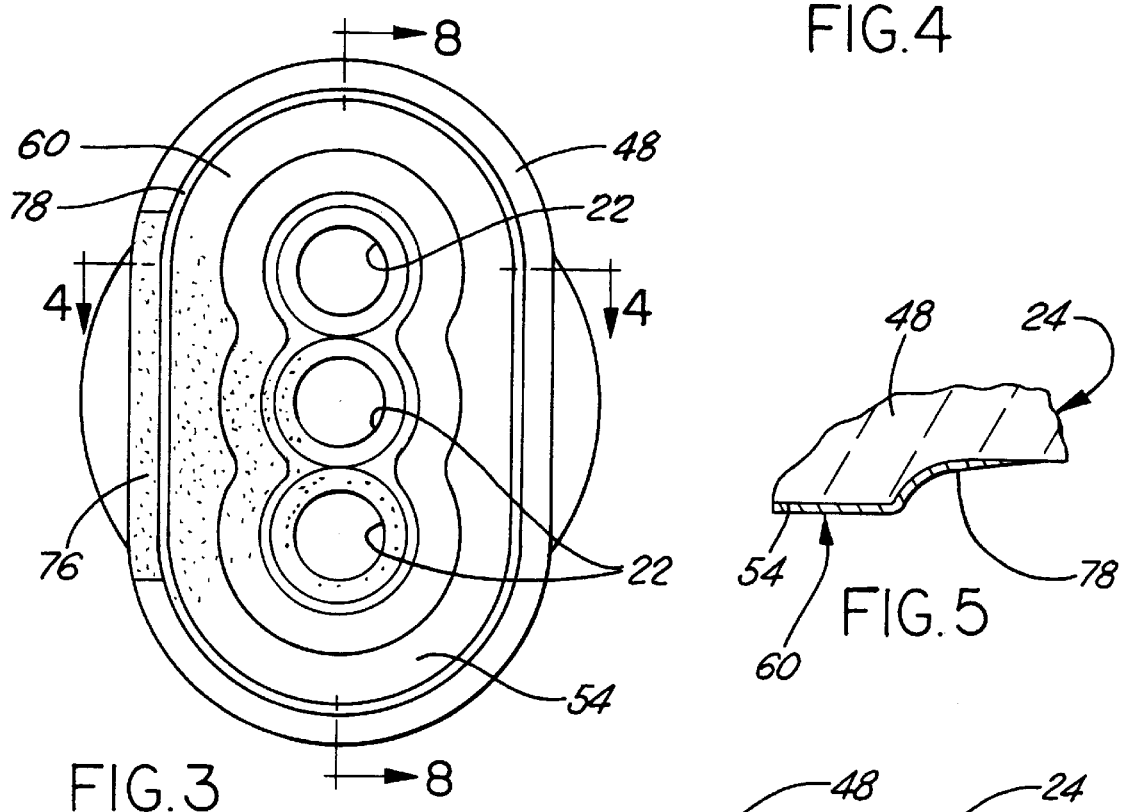
FIG. 3
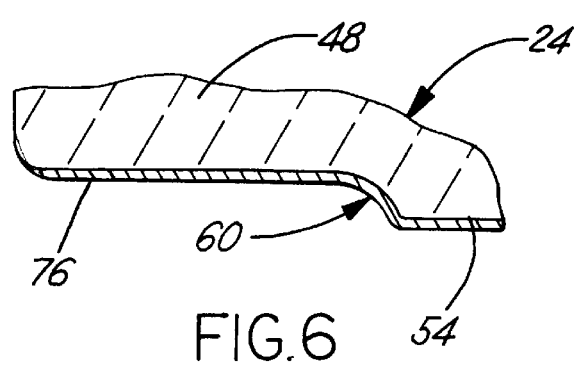
FIG. 5
FIG. 6

METHOD AND APPARATUS FOR DELIVERING A CASED GLASS STREAM HAVING IMPROVED RESISTANCE TO HIGH-TEMPERATURE EROSION

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed in U.S. Pat. No. 4,740,401 to provide a cased glass stream for forming glassware having layered wall segments. Published European Applications EPO722907A2 and EPO722908A2, both assigned to the assignee hereof, disclose techniques for delivering such a cased glass stream in which core glass from a first source is delivered through a first orifice. A second orifice is vertically spaced beneath and aligned with the first orifice, and is surrounded by a chamber that communicates with the second orifice through the gap between the first and second orifices. A heated tube delivers casing glass from a second glass source to the chamber that surrounds the second orifice. Glass flows by force of gravity through the orifices from the first and second sources in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, a problem remains concerning uniformity of distribution of casing glass thickness around the circumference of the core glass stream. The first and second glass flow orifices are provided in respective first and second orifice rings that are assembled to each other to form an orifice ring housing. The first or upper orifice ring has a peripheral flange that rests upon a ledge on the second or lower orifice ring. A pocket in the lower orifice ring cooperates with the underside of the upper orifice ring to form the metering gap between the orifices and the chamber through which casing glass flows to the metering gap. The orifice rings are preferably of high-temperature refractory composition. It has been found that the flow of glass can cause severe erosion of the upper orifice ring refractory material, as much as 0.007 inches per day. The metering gap between the orifice rings must be maintained within fairly close tolerances, on the order of about 0.10 inches, in order properly to meter and control casing glass distribution. Severe erosion of the refractory material reduces the useful life of an orifice ring housing to as little as three weeks. It has been proposed in above-noted U.S. Pat. No. 4,740,401 to provide a layer of platinum on the central flow passage, the orifice and the underside of the first or upper orifice ring to reduce or prevent erosion of the refractory material due to high temperature glass flow.

It is therefore a general object of the present invention to provide a method and apparatus for delivering a cased glass stream of the character disclosed in the above-noted applications that reduce erosion wear at the orifice ring housing, and therefore obtain an extended useful life of the orifice ring housing components. Another and more specific object of the present invention is to provide a method and apparatus for extending the useful life of the orifice ring housing components from as little as three weeks as is currently typical to on the order of six to nine months.

Apparatus in accordance with a presently preferred embodiment of the invention for forming a cased glass stream having an inner core glass surrounded by an outer casing glass includes a first orifice for receiving core glass from a first source, and a second orifice vertically spaced beneath and aligned with the first orifice. A chamber surrounds the second orifice and communicates with the second orifice through a metering gap between the first and second orifices. Casing glass is delivered from a second source to the chamber such that glass flows by gravity through the orifices from the first and second sources to form the cased glass stream. The first and second orifices are disposed in respective first and second orifice rings of refractory composition. The first orifice ring has a peripheral flange and an interior passage for glass flow from the first source to the first orifice. The second orifice ring has a peripheral ledge on which the flange rests, and a pocket for cooperating with the underside of the first orifice ring to form the chamber that surrounds the metering gap. At least the underside of the first orifice ring, and preferably the underside of the first orifice ring, the first orifice and the glass flow passage through the first orifice ring, includes a continuous layer of high-temperature erosion-resistant metallic composition such as platinum.

A method of preventing erosion of the first orifice ring in accordance with a second aspect of the present invention therefore comprises the step of lining the inner glass flow passage, the first orifice and the underside of the first orifice ring with a continuous layer of high-temperature erosion-resistant metallic composition such as platinum. The layer on the underside of the upper orifice ring preferably extends onto the peripheral flange of the upper orifice ring for disposition between the flange and its supporting ledge of the lower orifice ring to prevent glass flow erosion from eating around the edge of the layer. The platinum layer may be sprayed onto the first orifice ring, or provided as one or more separate sheets that are formed onto the orifice ring. The platinum layer preferably has a sprayed thickness in the range of about 0.005 to 0.007 inches.

BRIEF DESCRIPTION OF THE DRAWINGS

The invention, together with additional objects, features and advantages thereof, will be best understood from the following description, the appended claims and the accompanying drawings in which:

FIG. 3 is a top plan view of the upper orifice ring in the system of FIGS. 1 and 2;

FIG. 4 is a sectional view taken substantially along the line 4—4 in FIG. 3;

FIGS. 5 and 6 are fragmentary views on an enlarged scale of the portions of FIG. 4 within the circles 5 and 6;

DETAILED DESCRIPTION OF THE PREFERRED EMBODIMENTS

Figure 1:
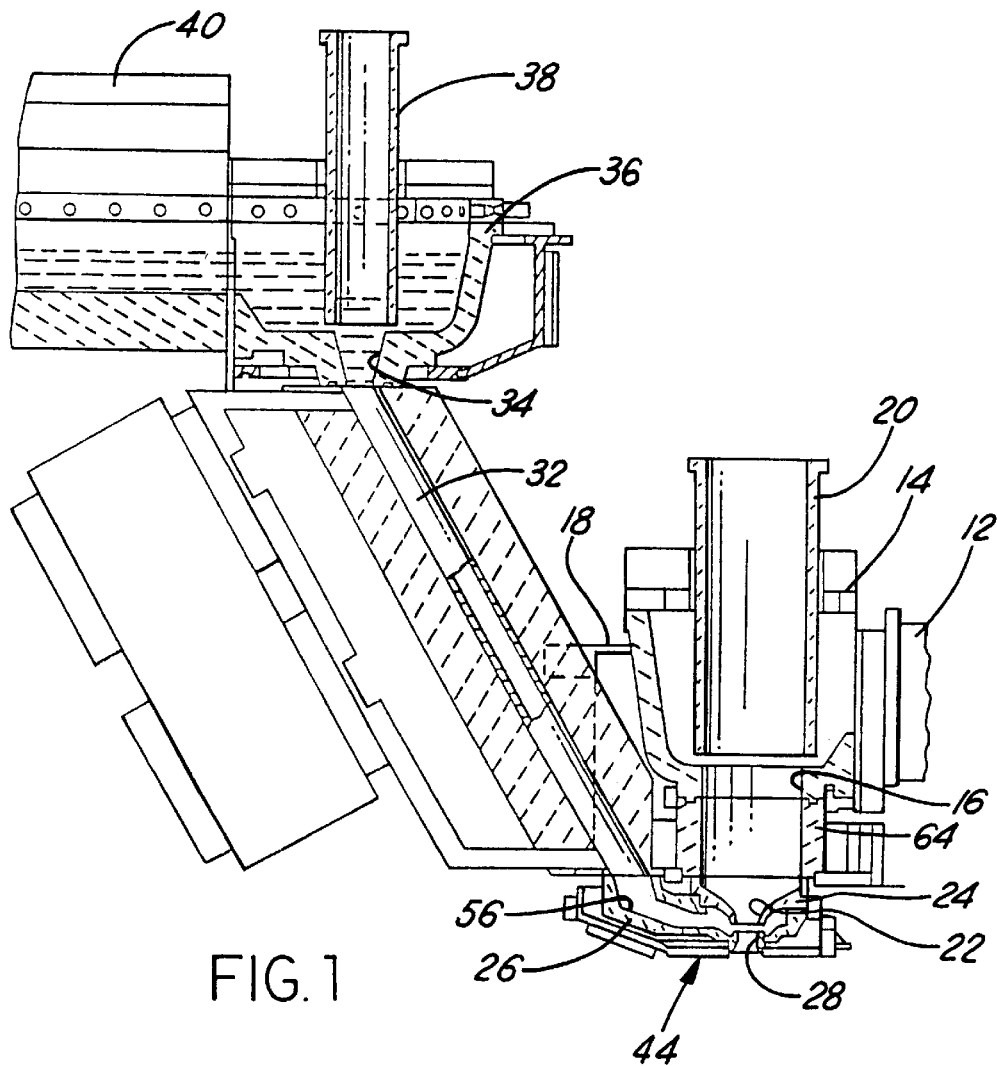
FIG. 1 is a fragmentary elevational schematic diagram of a cased glass delivery system in accordance with a presently preferred embodiment of the invention.
Figure 2:
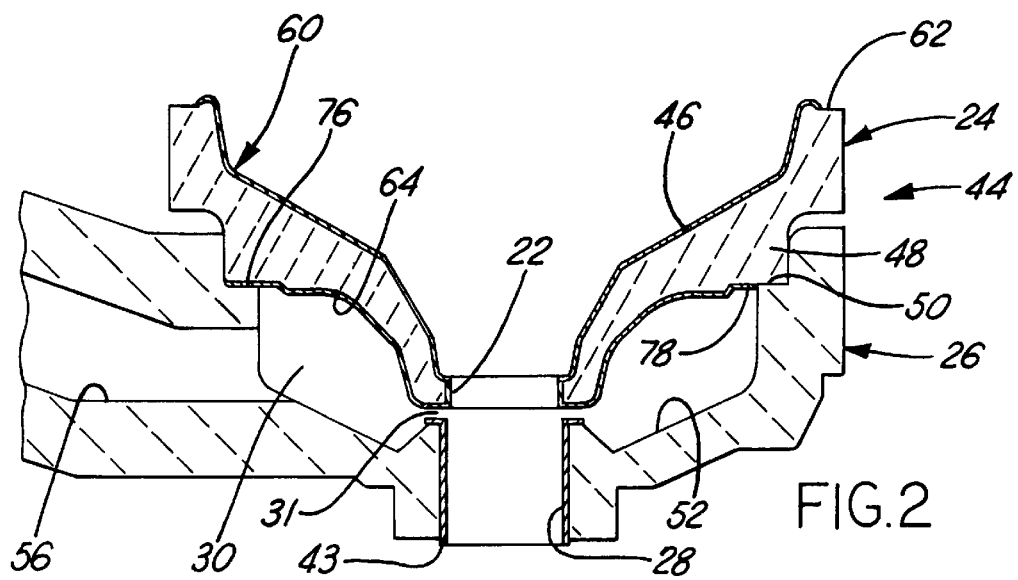
FIG. 2 is a fragmentary sectional view on an enlarged scale of the orifice rings and metering gap in the system of FIG. 1.
Figure 7:
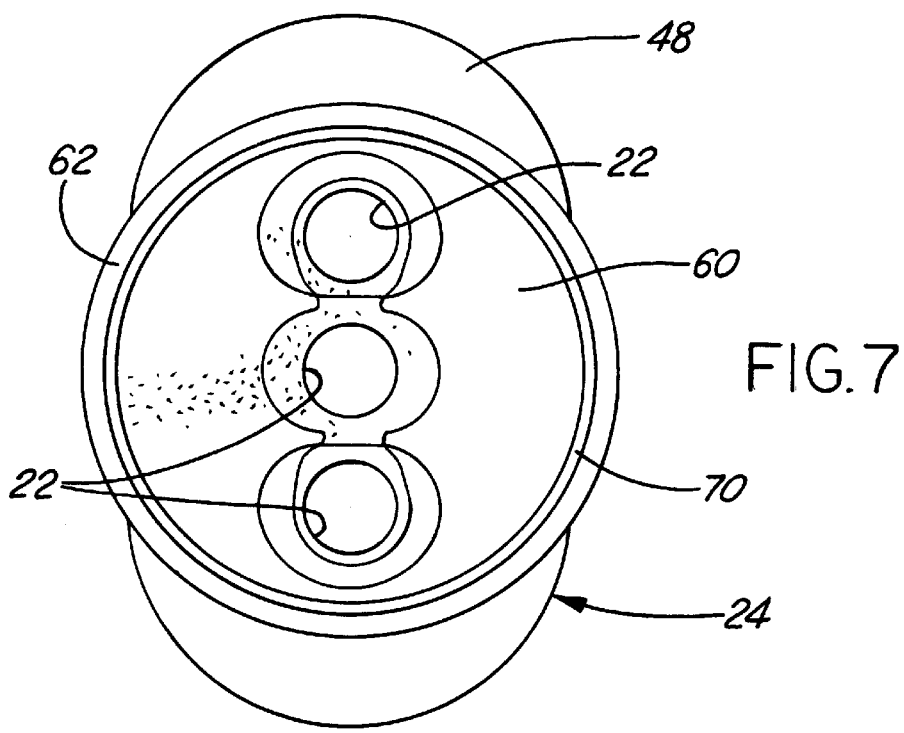
FIG. 7 is a bottom plan view of the upper orifice ring in FIGS. 1–3.

FIGS. 1 and 2 illustrate a system 10 for delivering a stream of cased glass. A first forehearth 12 delivers core glass to a spout 14 that has an opening 16 at the lower end thereof. Spout 14 is surrounded by a protective case 18, preferably constructed of non-magnetic metal such as stainless steel. A tube 20 controls delivery of core glass from spout 14 through opening 16 to and through at least one first orifice 22 carried by an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 22, 26. Chamber 30 communicates with orifice 28 by means of a lateral metering space or gap 31 between orifices 22, 28. Annular chamber 30 is coupled by a delivery tube 32 to the opening 34 at the lower end of a casing glass spout 36. Spout 36 includes a delivery control tube 38, and is coupled to a casing glass forehearth 40. Delivery tube 32 is resistance-heated by control electronics 42 for maintaining flow of casing glass to chamber 30. A platinum sleeve 43 is mounted on orifice ring 26 to form each orifice 28. To the extent thus far described, system 10 in FIGS. 1 and 2 is essentially the same as disclosed in above-noted Published European Applications EPO722907A2 and EPO722908A2. The former of such applications is directed in particular to construction of casing glass delivery tube 32, while the latter of such applications is directed in particular to construction of orifice rings 24, 26. The disclosures of such applications, both of which are assigned to the assignee hereof, are incorporated herein by reference for purposes of background.

As illustrated in FIGS. 2–9, orifice rings 24, 26 preferably are provided in the form of an orifice ring housing assembly 44. Upper orifice ring 24 has a peripheral flange 48 and a central passage 46 through which core glass flows to three laterally aligned orifices 22 (in a currently preferred triple-gob implementation). Flange 48 rests upon an upwardly facing shoulder or ledge 50 (FIG. 2) on lower orifice ring 26 and is fastened thereto by means not shown. A pocket 52 (FIG. 2) in lower orifice ring 26 cooperates with the underside or undersurface 54 of upper orifice ring 24 to form chamber 30. A passage 56 (FIG. 2) extends in lower orifice ring 26 laterally and upwardly from chamber 30 for connection to casing glass delivery tube 32 (FIG. 1). Orifice rings 24, 26 are preferably of high-temperature refractory composition. It has been found during operation of system 10 that high-temperature core glass flow through passage 46 and orifices 22, and high-temperature casing glass flow through chamber 30, metering gap 31 and orifice 28, cause severe erosion of the refractory material of upper orifice ring 24. The areas of most serious erosion are within passage 46 immediately above orifices 22, and the underside of ring 24 immediately beneath orifices 22 contiguous with gap 31. At glass flow temperatures of 2,000° F., erosion rates as high as 0.007 inches per day have been noted. This high erosion is believed to be caused by a soaking heat in the refractory material of upper orifice ring 24 due to the fact that high-temperature glass flows both inside of and outside of the orifice ring material. Stated differently, while orifice rings in conventional uncased glass manufacturing applications typically are externally surrounded by ambient air that allows heat transport through the refractory material, the lower portion of upper orifice ring 24 beneath flange 48 is surrounded both internally and externally by high-temperature flowing glass, thus allowing no heat transfer through the material. This soaking heat is believed to increase permeation of molten glass into the porous ceramic material of the orifice ring, greatly increasing the tendency to erode the refractory material.

Figure 8:
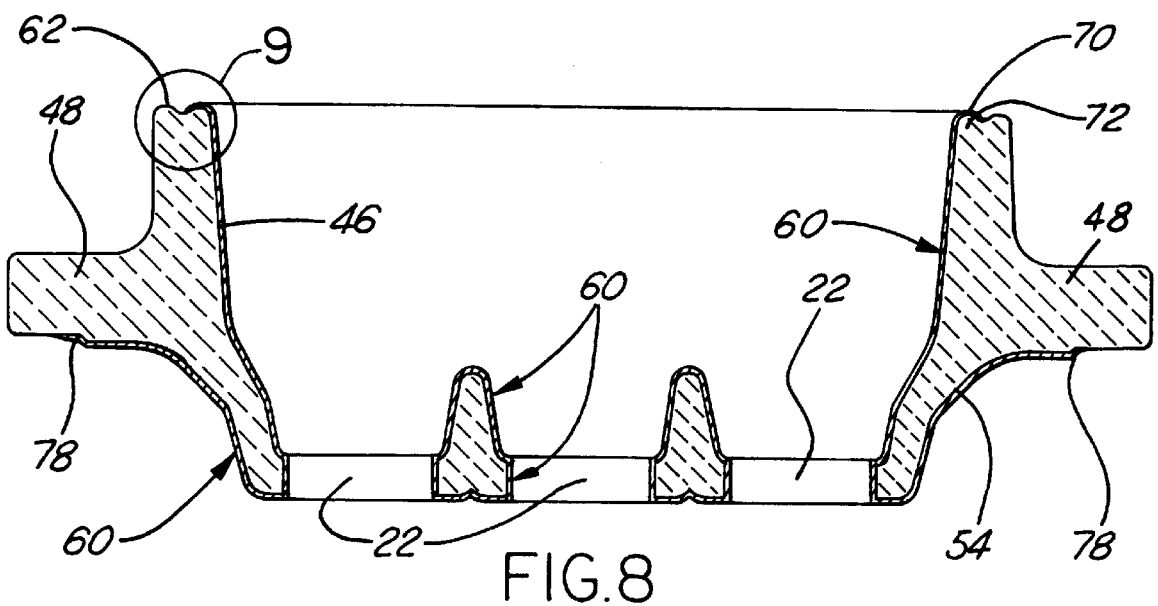
FIG. 8 is a sectional view taken substantially along the line 8—8 in FIG. 3.
Figure 9:
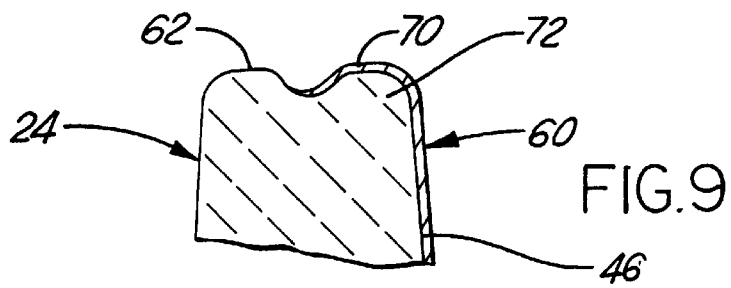
FIG. 9 is a fragmentary view in an enlarged scale of the portion of FIG. 8 within the circle 9.

In accordance with the present invention, it has been found that this erosion of the refractory material of the upper orifice ring, with consequent loss of control of the amount of glass metered through gap 31, is greatly reduced by lining the entire interior and underside of the upper orifice ring with a continuous layer 60 of high-temperature erosion-resistant metallic composition such as platinum. In particular, layer 60 covers the entire interior of passage 46 from the upper surface 62 that seats against core glass flow spacer 64 (FIG. 1), along the compound frusto-conical interior of passage 46, to and through orifices 22. At upper surface 62, layer 60 is feathered at 70 over a continuous annular bead 72 that seats against spacer 64, as best seen in FIGS. 4, 8 and 9. Layer 60 continues through orifices 22 to and along underside 54 of upper orifice ring 24 to and onto flange 48. Preferably, layer 60 extends at 76 between flange 48 of upper orifice ring 24 and ledge 50 of lower orifice ring 26 to the edge of flange 48 at least at that portion of the flange that overlies casing glass flow passage 56, as best seen in FIGS. 2–4 and 6. Around the remainder of the periphery of underside 54, layer 60 is feathered at 78 to terminate at ledge 50, as best seen in FIGS. 2–5 and 8. In situations where platinum layer 60 was terminated at the edge of ledge 50 above passage 56, it was found that the flow of casing glass through passage 56 and chamber 30 caused erosion of the refractory material of upper orifice ring 24 around the edge of the platinum layer immediately above the opening of passage 56 into chamber 30.

Platinum layer 60 may be either sprayed onto orifice ring 24, or provided as one or more separate sheets of platinum that are formed onto and bonded to the refractory material. A sprayed layer thickness about 0.005 to 0.007 inches is preferred. Provision of layer 60 as described has been found to extend the useful life of the upper orifice ring to on the order of six to nine months. This may be compared with a useful life of as little as three weeks without the platinum layer.

We claim:

1. An apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a metering gap between said first and second orifices, and means for delivering casing glass from a second source through a first passage having an outlet leading into said chamber such that glass flows by gravity through said orifices from said first and second sources to form said cased glass stream, said first orifice being disposed in a first orifice ring of refractory composition having a peripheral flange and an interior second passage for glass flow from said first source to said first orifice, said second orifice being disposed in a second orifice ring of refractory composition having a peripheral ledge on which said flange is mounted and a pocket for cooperating with an underside of said first orifice ring to form said chamber, said underside of said first orifice ring including a layer over said refractory composition of high-temperature erosion-resistant metallic composition, said layer extending from said underside of said first orifice ring through said first orifice and along said second passage, said layer also extending onto an underside of said flange and radially outwardly to a junction of said flange with said ledge and thence further radially outwardly into a circumferentially extending zone located between said flange and said ledge, said layer extending between said flange and said ledge to a radially outer peripheral edge of said flange at least in a portion of said zone that is aligned in overlying relation to said first passage outlet leading into said chamber.

2. The apparatus set forth in claim 1 wherein said layer is of platinum composition and wherein said layer of platinum composition extends between said flange and said ledge only in said portion of said zone.

3. The apparatus set forth in claim 2 wherein said layer is sprayed onto said first orifice ring.

4. The apparatus set forth in claim 2 wherein said layer comprises at least one metal sheet formed onto said first orifice ring.

5. The apparatus set forth in claim 2 wherein said layer has a thickness in the range of about 0.005 to 0.007 inches.

6. In an apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a metering gap between said first and second orifices, and means for delivering casing glass from a second source through a first passage having an outlet leading into said chamber such that glass flows by gravity through said orifices from said first and second sources to form said cased glass stream, said first orifice being disposed in a first orifice ring of refractory composition having a peripheral flange and an interior second passage for glass flow from said first source to said first orifice, said second orifice being disposed in a second orifice ring of refractory composition having a peripheral ledge on which said flange is mounted and a pocket for cooperating with an underside of said first orifice ring to form said chamber, a method of preventing erosion of said refractory material of said first orifice ring comprising the step of lining said second passage, said first orifice and said underside of said first orifice ring with a layer of high-temperature erosion-resistant metallic platinum composition, with said layer on said underside extending onto an underside of said flange between said flange and said ledge, and radially outwardly to a junction of said flange with said ledge and thence further radially outwardly in a circumferentially extending zone located between said flange and said ledge, said layer extending between said flange and said ledge at least in a portion of said zone aligned in overlying relation to said first passage outlet leading into said chamber.

* * * * *